United States Patent [19]

Melloni et al.

[11] 3,855,263
[45] Dec. 17, 1974

[54] TETRAHYDRO-2-NAPHTHYL ESTER DERIVATIVES OF TINONOCARBANILIC ACIDS

[75] Inventors: Piero Melloni; Raffaella Metelli; Vittorio Vecchietti; Willy Logeman; Ivo De Carneri; Silvana Castellino; Gisella Monti, all of Milan, Italy

[73] Assignee: Carlo Erba S.p.A., Milan, Italy

[22] Filed: Mar. 13, 1973

[21] Appl. No.: 340,932

[30] Foreign Application Priority Data
Mar. 20, 1972  Italy.................................. 22102/72

[52] U.S. Cl.............................. 260/455 A, 424/300
[51] Int. Cl........................................... C07c 155/00
[58] Field of Search................................ 260/455 A

[56] References Cited
UNITED STATES PATENTS

| | | | |
|---|---|---|---|
| 3,334,126 | 8/1967 | Miyazaki et al. | 260/455 A |
| 3,334,116 | 8/1967 | Miyazaki et al. | 260/455 A |

FOREIGN PATENTS OR APPLICATIONS

| | | | |
|---|---|---|---|
| 43-16980 | 7/1968 | Japan | 260/455 A |
| 43-6770 | 3/1968 | Japan | 260/455 A |
| 43-14452 | 6/1968 | Japan | 260/455 A |

*Primary Examiner*—Elbert L. Roberts
*Assistant Examiner*—D. R. Phillips
*Attorney, Agent, or Firm*—Cushman, Darby & Cushman

[57] ABSTRACT

Compounds of the formula

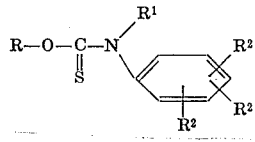

O-(1,4-methano-1,2,3,4-tetrahydro-6-naphthyl)-N-methyl-N-(m-chlorophenyl)-thiocarbamate.

are disclosed, such as for instance O-(1,4-methano-1,2,3,4-tetrahydro-6-naphthyl)-N-methyl-N-(m-tolyl)-thiocarbamate; 0-(1,4-ethano-1,2,3,4-tetrahydro-6-naphthyl)-N-methyl-N-(m-tolyl)-thiocarbamate; 0-(5,6,7,8-tetrahydro-2-naphthyl)-N-methyl-N-(m-tolyl)-thiocarbamate; and 0-(1,4-methano-1,2,3,4-tetrahydro-6-naphthyl)-N-methyl-N-(m-chlorophenyl0-thiocarbamate.

The thiocarbamic acid derivatives of the present invention have antifungal activity.

34 Claims, No Drawings

TETRAHYDRO-2-NAPHTHYL ESTER DERIVATIVES OF TINONOCARBANILIC ACIDS

This invention relates to compounds which are thiocarbamic acid derivatives having antifungal activity, to a process for their preparation and to pharmaceutical compositions containing these derivatives.

The compounds of the invention have the general formula (I)

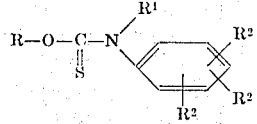

wherein R is a 5,6,7,8-tetrahydro-2-naphthyl group, i.e., a group of general formula

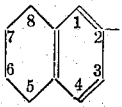

or R is a group of general formula

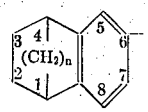

wherein n is 1, 2 or 3, $R^1$ is a hydrogen atom or a $C_{1-6}$ alkyl group; and each of the groups $R^2$, which may be the same or different, is a hydrogen or halogen atom, a nitro, cyano, trihalomethyl, phenyl, $C_{1-6}$ alkyl or $C_{1-6}$ alkoxy group or a group of formula —$SR^3$, —$COR^3$ or —$NHCOR^3$ wherein $R^3$ is a $C_{1-6}$ alkyl group.

The preferred compounds are those in which $R^1$ is an alkyl group and one of the $R^2$ groups is an alkyl or alkoxy group or a halogen atom, while the other two $R^2$ groups are hydrogen atoms. The alkyl groups may be branched or straight chain alkyl groups. The preferred alkyl group is the methyl group.

Examples of particularly preferred compounds are: O-(1,4-methano-1,2,3,4-tetrahydro-6-naphthyl)-N-methyl-N-(m-tolyl)-thiocarbamate, O-(1,4-ethano-1,2,3,4-tetrahydro-6-naphthyl)-N-methyl-N-(m-tolyl)-thiocarbamate, and O-(5,6,7,8-tetrahydro-2-naphthyl)-N-methyl-N-(m-tolyl)-thiocarbamate.

The compounds of general formula (I) may be prepared by a. reacting a compound of general formula (II)

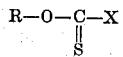

wherein R is as defined above, and X is a halogen atom, a group of formula —$S-R^4$ wherein $R^4$ is an alkyl or substituted or unsubstituted phenyl group, or a group of formula

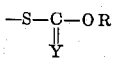

wherein R is as defined above and Y is a oxygen or sulphur atom, with an amine of general formula (III)

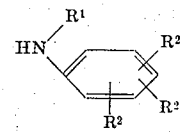

wherein $R^1$ and $R^2$ are as defined above; or b. reacting a compound of general formula (IV)

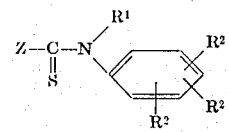

wherein $R^1$ and $R^2$ are as defined above and Z is a halogen atom, with a compound of general formula (V)

R—OM wherein R is as defined above and M is a hydrogen or metal atom; or c. reacting a compound of general formula (VI)

R—OH

VI wherein R is as defined above, with a compound of general formula (VII)

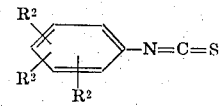

wherein $R^2$ is as defined above, to give a compound of general formula (I) wherein $R^1$ is a hydrogen atom.

When X is a halogen atom in the compounds of general formula (II), it is preferably a chlorine atom. These compounds of general formula (II) may be prepared for example by reaction of the compounds of general formula (VIII)

R — OW

VIII wherein W is preferably an alkali or alkaline earth metal atom, with thiophosgene, preferably performing the reaction in an organic solvent, for example chloroform or dioxan, and at 0° to 40°C, preferably 20°–30°C. The compounds of general formula (VIII) may be prepared, in their turn, starting from the compounds of general formula (VI) by known methods, for example by reaction with sodium hydroxide in a suitable solvent.

The compound of general formula (VI) wherein R is a 5,6,7,8-tetrahydro-2-naphthyl group is known in literature (see for example J. Am. Chem. Soc., 1947, 69, 578). The compound of general formula (VI) wherein R is the 1,4-methano-1,2,3,4-tetrahydro-6-naphthyl radical may be prepared for example by the method of Tetrahedron Letters, 1970, 14, 1145 starting from the corresponding methoxy derivative, described in for example in Can. J. Chem., 45 (11) 1185. The compound of general formula (VI) wherein R is a 1,4-ethano-1,2,3,4-tetrahydro-6-naphthyl group may be prepared, for example, by following the same method, starting from the corresponding methoxy derivative described for example in J. Org. Chem., 1971, 36 (3), 425. The compound of general formula (VI) wherein R is a 1,4-propano-1,2,3,4-tetrahydro-6-naphthyl radical may be prepared in a similar way.

The compounds of general formula (II) wherein X is a —S-R[4] group are known in literature [see for example Bull. Soc. Chim. Fr. [3], 35, 838; Agr. Biol. Chem. 1969, 33(12), 1691]. The compounds of general formula (II) wherein X is

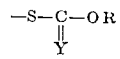

are also known (see for example J. Am. Chem. Soc. 1952, 74, 3647. The compounds of general formula (IV) are also known and may be obtained by means of methods known per se.

The reaction between the compounds of general formula (II), wherein X is halogen, and the compounds of general formula (III) is preferably performed in an organic solvent, for example chloroform or dioxan and in the presence of a hydrohalic acid acceptor, for example, sodium bicarbonate; however, the amine itself used in the reaction may act as the hydrohalic acid acceptor.

When the compounds of general formula (VIII) are reacted with thiophosgene, the compound of general formula (II) need not necessarily be isolated, it can be reacted direct with the compound of general formula (III) in the solution in the organic solvent, for example dioxan or choroform, used in the reaction between the compounds of general formula (VIII) and thiophosgene. The reaction between the compounds of general formula (II), wherein X is a —S-R[4] group, with the compounds of general formula (III) is preferably performed in organic solvents, in particular aliphatic alcohols, at 20° to 60°C. The reaction between the compounds of general formula (II) wherein X is a

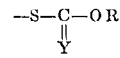

group, with the compounds of general formula (III) is preferably preformed in organic solvents, preferably aliphatic alcohols e.g., ethanol, at −10° to +20°C.

The reaction between the compounds of general formula (IV) and the compounds of general formula (V) is preferably performed in organic solvents for example acetone, at 10° to 20°C.

The reaction between the compounds of general formula (VI) and the compounds of general formula (VII), which are known in literature (see for example J. Chem. Soc.; 125, 1704) may be performed for example at reflux temperature in an organic apolar solvent, for example benzene or toluene, preferably by adding to the reaction mixture a tertiary base, for example triethylamine.

The compounds of the present invention possess a good topical antifungal activity of the fungicidal kind which is particularly efficacious against dermatophyte fungi, for example *Trichophyton*, *Epidermophyton* and *Microsporum*, and are therefore useful in the treatment of the infections caused by these microorganisms.

Table I shows for example the antifungal activity of the compounds O-(1,4-methano-1,2,3,4-tetrahydro-6-naphthyl)-N-methyl-N-(m-tolyl)-thiocarbamate (A) O-(1,4-ethano-1,2,3,4-tetrahydro-6-naphthyl)-N-methyl-N-(m-tolyl)-thiocarbamate (B), and 0-(5,6,7,8-tetrahydro-2-naphthyl)-N-methyl-N-(m-tolyl)-thiocarbamate (C) in comparison with tolnaftate in guinea-pig skin infected by *Trichophyton asteroides* using the modified Weinstein's method (Antimicrobial Agents and Chemotherapy, 1964, 595-601). The result are shown in Table I.

TABLE I

| Compound | Doses * | % Healed lesions | $ED_{50}$ | Potency ratio vs. tolnaftate |
|---|---|---|---|---|
| A | 0.01 | 25.0 | | |
| | 0.03 | 53.6 | 0.029 | 3.2 |
| | 0.10 | 77.9 | | |
| | 1.00 | 100.0 | | |
| B | 0.01 | 12.5 | | |
| | 0.03 | 29.16 | 0.048 | 1.93 |
| | 0.10 | 70.83 | | |
| | 1.00 | 100.0 | | |
| C | 0.01 | 12.5 | | |
| | 0.03 | 50.0 | 0.045 | 2.06 |
| | 0.10 | 62.5 | | |
| | 1.00 | 100.0 | | |
| Tolnaftate | 0.01 | 10.7 | | |
| | 0.03 | 18.7 | 0.093 | |
| | 0.10 | 60.0 | | |
| | 1.00 | 88.8 | | |

* The doses are given as concentrations (p/v) of the solutions with which each treatment was performed.

In Table I the antifungal activity was assayed according to a microbiological control performed by means of agar-cultures of skin samples taken from the lesions and according to $ED_{50}$ values calculated following Litchfield and Wilcoxon's method (J. Pharmacol. Exp. Ther. 1949, 96, 99-113) on the basis of the percentage of the healed lesions, i.e., negative to culture-control. As will be noted, the compounds of the invention have a surprisingly higher activity than tolnaftate.

Table II shows the activity ratio of Compound A and tolnaftate guinea-pig skin infected with *Trichophyton asteroides*, when calculated according to a macroscopic evaluation of the lesions in "scores."

TABLE II

| Doses * | | 0.01 | 0.03 | 0.10 | 1.00 |
|---|---|---|---|---|---|
| | $\bar{x}$ (scores mean) | 2.531 | 1.857 | 1.485 | 1.227 |
| Compound A | n (lesions number) | 32 | 28 | 68 | 44 |
| | S.E. (standard error) | 0.126 | 0.111 | 0.076 | 0.063 |
| | $\bar{x}$ | 3.392 | 3.062 | 2.650 | 1.833 |
| TOLNAFTATE | n | 28 | 32 | 60 | 36 |
| | S.E. | 0.187 | 0.190 | 0.171 | 0.129 |
| Potency ratio vs. tolnaftate = 26.84. | | | | | |

* The doses are given as concentrations (p/v) of the solutions with which each treatment was performed.

The test of Table II was performed according to a factorial scheme with two products, i.e., Compound A and tolnaftate, each of them administered in four doses, following the parallel line biological assay method (Finney Statistical Method in Biological Assay, Griffin, London, 1952) The values obtained in three tests are given as an arithmetic mean and mean standard error.

The data reproted in Table II show that the mean score relating to Compound A is lower than that of tolnaftate under all the doses tested, i.e., Compound A is more active. In order to give a quantitative evaluation of the difference between the two products, the activity ratio has been calculated by using the log dose-effect function reckoned on the basis of the data contained in the Table. Said ratio is 26.84 with variance limits (fiducial limits) ranging between 11.78 and 81.46 at a probability degree of 95 percent. The lower limit of 11.78 is much higher than 1 and this proves that there is a significant difference between the two products; this means that Compound A is always more active than tolnaftate.

Suitable forms for the administration of the compounds of the invention are for example solutions, ointments, creams as well as any other pharmaceutical composition indicated for the topical use. A suitable cream for topical use contains 0.5 to 1 g of the compound per 100 g cream.

The invention therefore also provides a pharmaceutical composition comprising a compound of general formula (I) and a pharmaceutically acceptable carrier or diluent.

The following Examples illustrate the present invention.

EXAMPLE 1

Thiophosgene (1.15 g; 0.01 mole) in chloroform (100 ml) was slowly treated with stirring with sodium 1,4-methano-1,2,3,4-tetrahydro-6-naphthoxide (1.82 g; 0.01 mole). After stirring for 30 minutes at room temperature, m-anisidine (2.46 g; 0.02 moles) in chloroform (50 ml) was added dropwise to the solution obtained. The mixture was then stirred for 2 hours at room temperature, the solvent evaporated, the residue redissolved in water and extracted with diethyl ether. The organic extracts gave, after drying ($Na_2SO_4$), evaporation, and crystallisation from ethanol at 95°, O-(1,4-methano-1,2,3,4-tetrahydro-6-naphthyl)-N-(m-methoxy-phenyl)-thiocarbamate (1.2 g) m.p. 121°–124°C.

By using the same method, the following compounds were obtained:

O-(1,4-methano-1,2,3,4-tetrahydro-6-naphthyl)-N-phenyl-thio-carbamate(after crystallisation from ethanol at 95°), m.p. 150°–152°C;

O-(1,4-methano-1,2,3,4-tetrahydro-6-naphthyl-N-(m-tolyl)-thiocarbamate(ethanol at 95°), m.p. 115°–118°C;

O-(1,4-methano-1,2,3,4-tetrahydro-6-naphthyl-N-(m-chlorophenyl)-thiocarbamate(ethanol at 95°), m.p. 119°–122°C;

O-(1,4-methano-1,2,3,4-tetrahydro-6-naphthyl)-N-(m-nitro-phenyl)-thiocarbamate(cyclohexane), m.p. 129°–131°C;

O-(1,4-methano-1,2,3,4-tetrahydro-6-naphthyl-N-(p-diphenyl)-thiocarbamate(isopropanol),m.p. 150°–153°C;

O-(1,4-methano-1,2,3,4-tetrahydro-6-naphthyl)-N-(2-methyl-4-chlorophenyl)-thiocarbamate(cyclohexane), m.p. 118°–122°C;

O-(1,4-methano-1,2,3,4-tetrahydro-6-naphthyl)-N-(2-methoxy-5-nitrophenyl)-thiocarbamate(absolute ethanol), m.p. 132°–135°C;

O-(1,4-methano-1,2,3,4-tetrahydro-6-naphthyl)-N-(m-tri-fluoromethyl-phenyl)-thiocarbamate (ethano/water), m.p. 116°–119°C;

O-(1,4-methano-1,2,3,4-tetrahydro-6-naphthyl)-N-(m-acetyl-phenyl)-thiocarbamate(absolute ethanol), m.p. 125°–127°C;

O-(1,4-methano-1,2,3,4-tetrahydro-6-naphthyl)-N-(m-acetamido-phenyl)-thiocarbamate;

O-(1,4-methano-1,2,3,4,-tetrahydro-6-naphthyl)-N-(m-cyano-phenyl)-thiocarbamate;

O-(1,4-methano-1,2,3,4-tetrahydro-6-naphthyl)-N-(m-methylthio-phenyl)-thiocarbamate (cyclohexane), m.p. 103°–104°C.

EXAMPLE 2

Thiophosgene (1.15 g; 0.01 mole) in chloroform (40 ml) was slowly treated at room temperature with sodium 1,4-methano-1,2,3,4-tetrahydro-6-naphthoxide (1.82 g; 0.01 mole). After 30 minutes, N-methyl-m-toluidine (2.42 g; 0.02 mole) in chloroform (40 ml) was added dropwise to the solution so obtained at room temperature. The reaction mixture was stirred for 48 hours at room temperature and then refluxed for 2 hours. The solvent was evaporated, and the residue redissolved in water and extracted repeatedly with diethyl ether. The organic phase was dried ($Na_2SO_4$) and evaporated to dryness to give, after crystallisation from isopropanol, O-(1,4-methano-1,2,3,4-tetrahydro-6-naphthyl)-N-methyl-N-(m-tolyl)-thiocarbamate (1.3 g) m.p. 92°–94°C.

By using the same method, the following compounds were obtained:

O-(1,4-methano-1,2,3,4-tetrahydro-6-naphthyl)-N-methyl-N-phenyl-thiocarbamate(isopropyl alcohol), m.p. 94°–97°C;

O-(1,4-methano-1,2,3,4-tetrahydro-6-naphthyl)-N-methyl-N-(p-nitrophenyl)-thiocarbamate (ethyl acetate), m.p. 177°–182°C;

O-(1,4-methano-1,2,3,4-tetrahydro-6-naphthyl)-N-methyl-N-(m-chlorophenyl)-thiocarbamate (ethanol at 95°), m.p. 110°–115°C;

O-(1,4-methano-1,2,3,4-tetrahydro-6-naphthyl)-N-methyl-N-(m-nitrophenyl)-thiocarbamate(methanol), m.p. 123°–126°C;

O-(1,4-methano-1,2,3,4-tetrahydro-6-naphthyl)-N-methyl-N-(m-methoxyphenyl)-thiocarbamate(diisopropyl ether/petroleum ether), m.p. 82°–84°C;

O-(1,4-methano-1,2,3,4-tetrahydro-6-naphthyl)-N-methyl-N-(p-tolyl)-thiocarbamate (absolute ethanol), m.p. 98°–101°C;

O-(1,4-methano-1,2,3,4-tetrahydro-6-naphthyl)-N-methyl-N-(p-diphenyl)-thiocarbamate (petroleum ether), m.p. 104°–107°C;

O-(1,4-methano-1,2,3,4-tetrahydro-6-naphthyl)-N-ethyl-N-phenyl-thiocarbamate(diisopropylether), m.p. 89°–91°C;

O-(1,4-methano-1,2,3,4-tetrahydro-6-naphthyl)-N-methyl-N-(m-trifluoromethylphenyl)-thiocarbamate, (absolute ethanol), m.p. 113°–116°C;

O-(1,4-methano-1,2,3,4-tetrahydro-6-naphthyl)-N-methyl-N-(m-acetylphenyl)-thiocarbamate, (ligroin), m.p. 96°–97°C;

O-(1,4-methano- 1,2,3,4,-tetrahydro-6-naphthyl)-N-methyl-N-(m-acetamidophenyl)-thiocarbamate;

O-(1,4-methano-1,2,3,4-tetrahydro-6-naphtyl)-N-methyl-N-(m-cyanophenyl)-thiocarbamate;

O-(1,4-methano-1,2,3,4-tetrahydro-6-naphthyl)-N-methyl-N-(m-methylthiophenyl)-thiocarbamate.

EXAMPLE 3

Thiophosgene (0.575 g; 0.005 mole) in chloroform 40 ml.) was slowly treated with stirring with sodium 1,-4-ethano-1,2,3,4-tetrahydro-6-naphthoxide (0.98 g; 0.005 mole) at room temperature. After 30 minutes m-toluidine (1.01 g; 0.01 mole) in chloroform (30 ml) was added dropwise to the solution so obtained. The mixture was subsequently stirred for an hour at room temperature, the solvent was evaporated and the residue redissolved in water and extracted with diethyl ether. The organic phase, after drying ($Na_2SO_4$), evaporation to dryness and crystallisation from absolute ethanol gave o-(1,4-ethano-1,2,3,4-tetrahydro-6-naphtyl)-N-(m-tolyl)thiocarbamate (1.25 g) m.p. 127°–131°C.

By using the same method, the following compounds were obtained:

O-(1,4-ethano-1,2,3,4-tetrahydro-6-naphthyl)-N-methyl-N-(m-tolyl)-thiocarbamate (ethanol at 95°), m.p. 110°–112°C;

O-(1,4-ethano-1,2,3,4-tetrahydro-6-naphthyl)-N-phenyl-thiocarbamate;

O-(1,4-ethano-1,2,3,4-tetrahydro-6-naphthyl)-N-(m-chlorophenyl)-thiocarbamate;

O-(1,4-ethano-1,2,3,4-tetrahydro-6-naphthyl-N-(m-nitrophenyl)-thiocarbamate;

O-(1,4-ethano-1,2,3,4-tetrahydro-6-naphthyl)-N-(p-diphenyl)-thiocarbamate;

O-(1,4-ethano-1,2,3,4-tetrahydro-6-naphthyl)-N-(2-methyl-4-chlorophenyl)-thiocarbamate;

O-(1,4-ethano-1,2,3,4-tetrahydro-6-naphthyl)-N-(2-methoxy-5-nitrophenyl)-thiocarbamate;

O-(1,4-ethano-1,2,3,4-tetrahydro-6-naphthyl)-N-(m-trifluoro-methyl-phenyl)-thiocarbamate;

O-(1,4-ethano-1,2,3,4-tetrahydro-6-naphthyl)-N-(m-acetylphenyl)-thiocarbamate;

O-(1,4-ethano-1,2,3,4-tetrahydro-6-naphthyl)-N-(m-acetamidophenyl)-thiocarbamate;

O-(1,4-ethano-1,2,3,4-tetrahydro-6-naphthyl)-N-(m-cyanophenyl)-thiocarbmate;

O-(1,4-ethano-1,2,3,4-tetrahydro-6-naphthyl)-N-(m-methyl-thiophenyl)-thiocarbamate;

O-(1,4-ethano-1,2,3,4-tetrahydro-6-naphthyl)-N-(m-methoxyphenyl)-thiocarbamate;

O-(1,4-ethano-1,2,3,4-tetrahydro-6-naphthyl)-N-methyl-N-phenyl-thiocarbamate;

O-(1,4-ethano-1,2,3,4-tetrahydro-6-naphthyl-N-methyl-N-(m-chlorophenyl)-thiocarbamate;

O-(1,4-ethano-1,2,3,4-tetrahydro-6-naphthyl)-N-methyl-N-(m-nitrophenyl)-thiocarbamate;

O-(1,4-ethano-1,2,3,4-tetrahydro-6-naphthyl)-N-methyl-N-(p-nitrophenyl)-thiocarbamate;

O-(1,4-ethano-1,2,3,4-tetrahydro-6-naphthyl)-N-methyl-N-(m-methoxyphenyl)-thiocarbamate;

O-(1,4-ethano-1,2,3,4-tetrahydro-6-naphthyl)-N-methyl-N-(p-tolyl)-thiocarbamate;

O-(1,4-ethano-1,2,3,4-tetrahydro-6-naphthyl)-N-methyl-N-(p-diphenyl)-thiocarbamate;

O-(1,4-ethano-1,2,3,4-tetrahydro-6-naphthyl)-N-ethyl-N-phenyl-thiocarbamate;

O-(1,4-ethano-1,2,3,4-tetrahydro-6-naphtyl)-N-methyl-N-(m-trifluoromethylphenyl)-thiocarbamate;

O-(1,4-ethano-1,2,3,4-tetrahydro-6-naphthyl)-N-methyl-N-(m-acetylphenyl)-thiocarbamate;

O-(1,4-ethano-1,2,3,4-tetrahydro-6-naphthyl)-N-methyl-N-(m-acetamidophenyl)-thiocarbamate;

O-(1,4-ethano-1,2,3,4-tetrahydro-6-naphthyl)-N-methyl-N-(m-cyanophenyl)-thiocarbamate;

O-(1,4-ethano-1,2,3,4-tetrahydro-6-naphthyl)-N-methyl-N-(m-methylthiophenyl)-thiocarbamate.

EXAMPLE 4

Thiophosgene (5.75 g; 0.05 mole) in chloroform (100 ml) was treated slowly with sodium 5,6,7,8-tetrahydro-2-naphthoxide (8.5 g; 0.05 mole) at room temperature. After stirring the suspension for about half an hour, N-Methyl-m-toluidine (12.1 g; 0.1 mole) in chloroform (100 ml) was added at room temperature. After stirring for 12 hours at room temperature. The solvent was evaporated and the residue, dissolved in water, was extracted with diethyl ether. The ethereal extracts, after drying and evaporation, gave a crude oil which was purified by column chromatography and was then allowed to stand for a long time, to obtain O-(5,6,7,8-tetrahydro-2-naphthyl)-N-methyl-N-(m-tolyl)-thiocarbamate (10.4 g) m.p. 48°–51°C.

The following compounds were analogously prepared:

O-(5,6,7,8-tetrahydro-2-naphthyl)-N-(m-tolyl)-thiocarbamate (m.p. 108°–112°C);

O-(5,6,7,8-tetrahydro-2-naphthyl)-N-phenyl-thiocarbamate;

O-(5,6,7,8-tetrahydro2-naphthyl)-N-(m-chlorophenyl)-thiocarbmate;

O-(5,6,7,8-tetrahydro-2-naphthyl)-N-(m-nitrophenyl)-thiocarbamate;

O-(5,6,7,8-tetrahydro-2-naphthyl)-N-(p-diphenyl)-thiocarbamate;

O-(5,6,7,8-tetrahydro-2naphthyl)-N-(2-methyl-4-chlorophenyl)-thiocarbamate;

O-(5,6,7,8-tetrahydro-2-naphthyl)-N-(2-methoxy-5-nitrophenyl)-thiocarbamate;

O-(5,6,7,8-tetrahydro-2-naphthyl)-N-(m-trifluoromethylphenyl)-thiocarbamate;

O-(5,6,7,8-tetrahydro-2-naphthyl)-N-(m-acetylphenyl)-thiocarbamate;

O-(5,6,7,8-tetrahydro-2-naphthyl)-N-(m-acetamidophenyl)-thiocarbamate;

O-(5,6,7,8-tetrahydro-2-naphthyl)-N-(m-cyanophenyl)-thiocarbamate;

O-(5,6,7,8-tetrahydro-2-naphthyl)-N-(m-methylthiophenyl)-thiocarbamate;

O-(5,6,7,8-tetrahydro-2-naphthyl)-N-(m-methoxyphenyl)-thiocarbamate;

O-(5,6,7,8-tetrahydro-2-naphthyl)-N-methyl-N-phenyl-thiocarbamate;

O-(5,6,7,8-tetrahydro-2-naphthyl)-N-methyl-N-(m-chlorophenyl)-thiocarbamate;

O-(5,6,7,8-tetrahydro-2-naphthyl)-N-methyl-N-(m-nitrophenyl)-thiocarbamate;

O-(5,6,7,8-tetrahydro-2-naphthyl)-N-methyl-N-(p-nitrophenyl)-thiocarbamate;

O-(5,6,7,8-tetrahydro-2-naphthyl)-N-methyl-N-(m-methoxyphenyl)-thiocarbamate;

O-(5,6,7,8-tetrahydro-2-naphthyl)-N-methyl-N-(p-tolyl)-thiocarbamate;

O-(5,6,7,8-tetrahydro-2-naphthyl)-N-methyl-N-(p-diphenyl)-thiocarbamate;

O-(5,6,7,8-tetrahydro-2-naphthyl)-N-ethyl-N-phenyl-thiocarbamate;

O-(5,6,7,8-tetrahydro-2-naphthyl)-N-methyl-N-(m-trifluoromethylphenyl)-thiocarbamate;

O-(5,6,7,8-tetrahydro-2-naphthyl)-N-methyl-N-(m-acetylphenyl)-thiocarbamate;

O-(5,6,7,8-tetrahydro-2-naphthyl)-N-methyl-N-(m-acetamideophenyl)-thiocarbamate;

O-(5,6,7,8-tetrahydro-2-naphthyl)-N-methyl-N-(m-cyanophenyl)-thiocarbamate;

O-(5,6,7,8-tetrahydro-2-naphthyl)-N-methyl-N-(m-methylthiophenyl)-thiocarbamate.

EXAMPLE 5

Thiophosgene (1.15 g; 0.01 moles) in chloroform (40 ml), was slowly treated with sodium 1,4-methano-1,2,3,4-tetrahydro-6-naphthoxide (1.82 g; 0.01 mole) at room temperature. After 30 minutes, the undissolved material was filtered off and the filtrate was evaporated to dryness to give O-(1,4-methano-1,2,3,4-tetrahydro-6-naphthyl)-chlorothioformate (2,3 g; $n_D^{20}$ = 1.5930). N-methyl-m-toluidine (2.42 g; 0.02 mole) was added dropwise to this compound in a little chloroform at room temperature. The reaction mixture was stirred for 48 hours at room temperature, then refluxed for 2 hours. The solvent was evaporated, and the residue redissolved in water and extracted repeatedly with diethyl ether. The organic phase was dried ($Na_2SO_4$) and evaporated to dryness to give, after crystallisation from isopropanol, O-(1,4-methano-1,2,3,4-tetrahydro-6-naphthyl)-N-methyl-N-(m-tolyl)-thiocarbamate (1,3 g) m.p. 92°–94°C.

By following the same method, the other compounds described in Examples 1 to 4 could be obtained.

EXAMPLE 6

Thiophosgene (0.115 g; 0.001 moles) in chloroform (20 ml) was treated dropwise with stirring with sodium 1,4-ethano-1,2,3,4-tetrahydro-6-naphthoxide (0.197 g; 0.001 mole). The mixture was then heated for 15 minutes at 30°–40°C and cooled, the undissolved product was filtered and the filtrate was added dropwise to a suspension of N-methyl-m-toluidine (0.121 g; 0.001 mole) and sodium bicarbonate (0.084 g; 0.001 mole) in ethanol, (30 ml). The mixture was stirred and cooled to 0° to 10°C. The mixture was kept for 30 minutes at 40°–50°C, and then the solvent was evaporated. The residue was redissolved in water and extracted with chloroform. The organic extracts gave, after drying ($CaCl_2$), evaporation and crystallisation from ethanol/water, o-(1,4-ethano-1,2,3,4-tetrahydro-6-naphthyl)-N-methyl-N-(m-tolyl)-thiocarbamate (0.19 g) m.p. 110°–112°C.

By following the same method, the other compounds described in Example 1 to 4 could be obtained.

EXAMPLE 7 m-Toluidine (1.07 g; 0.01 mole) in ethanol (10 ml) was treated with S-ethyl O-(1,4-methano-1,2,3,4-tetrahydro-6-naphthyl)dithiocarbonate (2.64 g; 0.01 mole) in ethanol (20 ml) at room temperature. The mixture was kept for about 20 hours at 50°C and then evaporated to dryness, the residue gave, after repeated crystallisations from ethanol at 95°, O-(1,4-methano-1,2,3,4-tetrahydro-6-naphthyl)-N-(m-tolyl)-thiocarbamate (1.55 g), m.p. 115°–118°C.

By following the same method, the other compounds described in Examples 1 to 4 could be obtained.

EXAMPLE 8

1,4-Methano-1,2,3,4-tetrahydro-6-naphthyloxy formic 1,4-methano-1,2,3,4-tetrahydro-6-naphthyloxythioformic thio anhydride [4.22 g; 0.01 mole; prepared by Holmberg's method (J. Prakt. Chem. 1905, 2, 71, 264] in ethanol (~50 ml) was treated dropwise with aniline (2.0 g; 0.0215 mole) under stirring and cooling at 0°C. After stirring for 3 hours at room temperature, the reaction mixture was midly acidified with 3N-hydrochloric acid, diluted in water, cooled and filtered. The precipitate thus obtained, after repeated recrylstalisations from isopropanol, gave O-(1,4-methano-1,2,3,4-tetrahydro-6-naphthyl)-N-phenyl-thiocarbamate (1.4 g) m.p. 150°–152°C.

The other compounds described in Examples 1 to 4 could be obtained by following the same method.

EXAMPLE 9

1,4-Methano-1,2,3,4-tetrahydro-6-naphthol (16 g; 0.1 mole) in acetone (~100 ml) was treated with sodium carbonate (10.6 g; 0.1 mole). Then N-methyl-N-(m-tolyl)thio-carbamoyl/chloride (19.9 g; 0.1 mole) was added at room temperature. The mixture was stirred, refluxed for 2 hours, cooled and redissolved in water (~200 ml), and the solid product thus obtained was filtered, washed with water and crystallised from ligroin to give O-(1,4-methano-1,2,3,4-tetrahydro-6-naphthyl)-N-methyl-N-(m-tolyl)-thiocarbamate (12.9 g) m.p. 92°–94°C.

The other compounds of Examples 1 to 4 could be prepared by following the same method.

EXAMPLE 10

1,4-Methano-1,2,3,4-tetrahydro-naphth-6-ol (12 g; 0.075 mole) and phenyl isothiocyanate (10 g; 0.074 mole) were refluxed for 8 hours in dry benzene (100 ml), after addition of a few drops of triethylamine. Removal of the benzene under vacuum gave an oily residue which was then crystallised from isopropanol to give O-(1,4-methano-1,2,3,4-tetrahydro-6-naphthyl)-N-phenyl-thiocarbamate (8.9 g) m.p. 150°–152°C.

By following the same method, the other compounds described in Example 1 could be obtained and further the compounds described in Examples 3 and 4, wherein $R_1$ is a hydrogen atom, could be obtained.

What we claim is:

1. A compound of general formula (I)

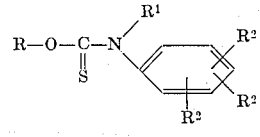

I wherein R is a 5,6,7,8-tetrahydro-2-naphthyl group or a group of general formula

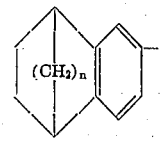

wherein n is 1, 2 or 3; $R^1$ is a hydrogen atom or a $C_{1-6}$ alkyl group; and each of the groups $R^2$ which may be the same or different, is a hydrogen or halogen atom, a nitro, cyano, trihalomethyl, phenyl, $C_{1-6}$ alkyl or $C_{1-6}$ alkoxy group or a group of formula $-SR^3$, $-COR^3$ or $-NHCOR^3$ wherein $R^3$ is a $C_{1-6}$ alkyl group.

2. Compound according to claim 1, wherein n is 1 or 2, $R^1$ is a $C_{1-6}$ alkyl group, and each of the groups $R^2$, which may be the same or different, is selected from the group consisting of hydrogen, a halogen atom, and a $C_{1-6}$ alkyl group.

3. Compound according to claim 2, wherein two of the $R^2$ groups are hydrogen.

4. Compound according to claim 3, wherein the $R^2$ group which is not hydrogen is chloro or methyl.

5. Compound according to claim 4, wherein $R^1$ is methyl.

6. Compound according to claim 1, wherein n is 1 or 2, $R^1$ is methyl, two of the $R^2$ groups are hydrogen and the other $R^2$ group is methyl or halogen.

7. Compound according to claim 6, wherein said other $R^2$ group is a chloro group.

8. A compound according to claim 1 wherein $R^1$ and one of the groups $R^2$ are methyl groups.

9. O-(5,6,7,8-tetrahydro-2-naphthyl)-N-(m-tolyl)-thiocarbamate, as claimed in claim 1.

10. O-(5,6,7,8-tetrahydro-2-naphthyl)-N-methyl-N-(m-tolyl)-thiocarbamate, as claimed in claim 1.

11. O-(1,4-methano-1,2,3,4-tetrahydro-6-naphthyl)-N-Phenyl-thiocarbamate, as claimed in claim 1.

12. O-(1,4-methano-1,2,3,4,-tetrahydro-6-naphthyl)-N-(m-tolyl)-thiocarbamate, as claimed in claim 1.

13. O-(1,4-methano-1,2,3,4-tetrahydro-6-naphthyl)-N-(m-methoxyphenyl)-thiocarbamate, as claimed in claim 1.

14. O-(1,4-methano-1,2,3,4-tetrahydro-6-naphthyl)-N-(m-chlorophenyl)-thiocarbamate, as claimed in claim 1.

15. O-(1,4-methano-1,2,3,4-tetrahydro-6-naphthyl)-N-(m-nitrophenyl)-thiocarbamate, as claimed in claim 1.

16. O-(1,4-methano-1,2,3,4-tetrahydro-6-naphthyl)-N-(p-diphenyl)-thiocarbamate, as claimed in claim 1.

17. O-(1,4-methano-1,2,3,4-tetrahydro-6-naphthyl)-N-(2-methyl)-4-chlorophenyl)-thiocarbamate, as claimed in claim 1

18. O-(1,4-methano-1,2,3,4-tetrahydro-6-naphthyl)-N-(2-methoxy-5-nitrophenyl)-thiocarbamate, as claimed in claim 1.

19. O-(1,4-methano-1,2,3,4-tetrahydro-6-naphthyl-N-(m-trifluoromethyl-phenyl)-thiocarbamate, as claimed in claim 1.

20. O-(1,4-methano-1,2,3,4-tetrahydro-6-naphthyl)-N-(m-acetyl-phenyl)-thiocarbamate, as claimed in claim 1.

21. O-(1,4-methano-1,2,3,4-tetrahydro-6-naphthyl-N-(m-methylthiophenyl)-thiocarbamate, as claimed in claim 1.

22. O-(1,4-methano-1,2,3,4-tetrahydro-6-naphthyl)-N-methyl-N-phenyl-thiocarbamate, as claimed in claim 1.

23. O-(1,4-methano-1,2,3,4-tetrahydro-6-naphthyl)-N-methyl-N-(m-tolyl)-thiocarbamate, as claimed in claim 1.

24. O-(1,4-methano-1,2,3,4-tetrahydro-6-naphthyl)-N-methyl-n-(p-nitrophenyl)-thiocarbamate, as claimed in claim 1.

25. O-(1,4-methano-1,2,3,4-tetrahydro-6-naphthyl)--methyl-N-(m-chlorophenyl-thiocarbamate, as claimed in claim 1.

26. O-(1,4-methano-1,2,3,4-tetrahydro-6-naphthyl)-N-methyl-N-(m-nitrophenyl)-thiocarbamate, as claimed in claim 1.

27. O-(1,4-methano-1,2,3,4-tetrahydro-6-naphthyl)-N-methyl-N-(m-methoxyphenyl)-thiocarbamate, as claimed in claim 1.

28. O-(1,4-methano-1,2,3,4-tetrahydro-6-naphthyl)-N-methyl-N-(p-tolyl)thiocarbamate, as claimed in claim 1.

29. O-(1,4-methano-1,2,3,4-tetrahydro-6-naphthyl)-N-methyl-N-(p-diphenyl)-thiocarbamate, as claimed in claim 1.

30. O-(1,4-methano-1,2,3,4-tetrahydro-6-naphthyl)-N-ethyl-N-phenyl-thiocarbamate, as claimed in claim 1.

31. O-(1,4-methano-1,2,3,4-tetrahydro-6-naphthyl)-N-methyl-N-(m-trifluoromethylphenyl)-thiocarbamate, as claimed in claim 1.

32. O-(1,4-methano-1,2,3,4-tetrahydro-6-naphthyl)-N-methyl-N-(m-acetylphenyl)-thiocarbamate, as claimed in claim 1

33. O-(1,4-ethanno-1,2,3,4-tetrahydro-6-naphthyl)-N-(m-tolyl)-thiocarbamate, as claimed in claim 1.

34. O-(1,4-ethano-1,2,3,4-tetrahydro-6-naphthyl)-N-methyl-N-(m-tolyl)-thiocarbamate, as claimed in claim 1.

* * * * *

UNITED STATES PATENT OFFICE
CERTIFICATE OF CORRECTION

Patent No. 3,855,263  Dated December 17, 1974

Inventor(s) Piero Melloni et al.  Page 1 of 2

It is certified that error appears in the above-identified patent and that said Letters Patent are hereby corrected as shown below:

Title of invention should read --TETRAHYDRO-2-NAPHTHYL ESTER DERIVATIVES OF THIONOCARBANILIC ACIDS --.

Cancel in the Abstract "O-(1,4-methano-1,2,3,4-tetrahydro-6-naphthyl)-N-methyl-N-(m-chlorophenyl)-thiocarbamate".

Column 3, line 40, "preformed" should read --performed--.
Column 5, line 4 , "reproted" should read --reported--.
Column 6, line 5 , "ethano" should read --ethanol--.
Column 7, line 1 , "naphtyl" should read --naphthyl--;
         line 7, the bracket before "40ml.)" is missing.
Column 7, line 45, "thiocarbmate" should read --thiocarbamate--;
         line 52, the bracket after "naphthyl" is missing.
Column 8, lines 17-18, the punctuation is incorrect, i.e.,
                "After stirring for 12 hours at room temperature
                The solvent...." instead of "After stirring
                for 12 hours ar toom temperature, the solvent";
         line 38, the hyphen between "-2" and "naphthyl)-" is
                missing.
Column 9, line 8 , "acetamideophenyl" should read --acetamidophenyl--.
Column 10, line 14, "recrylstal" should read --recrystal--.

UNITED STATES PATENT OFFICE
CERTIFICATE OF CORRECTION

Patent No. 3,855,263          Dated December 17, 1974

Inventor(s)   Piero Melloni et al.          Page 2 of 2

It is certified that error appears in the above-identified patent and that said Letters Patent are hereby corrected as shown below:

Claim 24, line 16, "N-methyl-n-" should read -- N-methyl-N- --.

Claim 25, line 19, "-methyl-N-(m-chlorophenyl-thiocarbamate" should read -- -N-methyl-N-(m-chlorophenyl)-thiocarbamate --.

Claim 33, line 43, "-ethanno-" should read -- ethano --.

Signed and Sealed this twenty-fifth Day of May 1976

[SEAL]

Attest:

RUTH C. MASON
Attesting Officer

C. MARSHALL DANN
Commissioner of Patents and Trademarks